3,026,346
IMPROVED PROCESS FOR THE NITRILATION OF
6-HALOHEXANOIC ACID ESTERS
Benjamin T. Freure and Harry J. Decker, Charleston,
W. Va., assignors to Union Carbide Corporation, a corporation of New York
No Drawing. Filed Sept. 24, 1958, Ser. No. 762,916
6 Claims. (Cl. 260—464)

This invention relates to an improved process for the production of esters of 7-aminoheptanoic acid. It is a continuation-in-part of application Serial No. 682,274, filed September 6, 1957, now abandoned.

The large scale preparation of 7-aminoheptanoic acid or its esters has hitherto presented difficulties, although many processes have been proposed. Among the previously proposed processes may be mentioned the reaction of epsilon-iodoamyl benzamide or epsilon-iodoamyl phthalimide with the sodium derivative of diethyl malonate followed by hydrolysis of the resulting product with a strong mineral acid. 6-bromohexanoic acid has been used to prepare salts of 6-cyanohexanoic acid, which were then hydrogenated to obtain the corresponding salt of the 7-amino acid in low yield. 7-aminoheptanoic acid has also been prepared by reaction of epsilon-caprolactam with dimethyl sulfate; from suberone and hydroxylamine in the presence of sulfuric acid; and by partial hydrogenation of pimelonitrile followed by alkaline hydrolysis and neutralization. However, none of the above methods for the production of 7-aminoheptanoic acid have been practical for large scale production practices.

It has now been found that esters of 7-aminoheptanoic acid can be produced by commercially feasible methods in high yields and at economical costs and in satisfactory purity for producing the polymerizates thereof by means of the process herein described. In carrying out the process of this invention a 6-halohexanoic acid is esterified and then nitrilated with an alkali metal cyanide or alkaline earth metal cyanide in the presence of a liquid polar organic solvent, which is inert under the nitrilation conditions employed, to produce the ester of 6-cyanohexanoic acid. Subsequently the cyano group is reduced to yield the 7-aminoheptanoate ester. The preferred cyanides are the alkali metal cyanides.

The advantages of the present process over the known methods are achieved by the use of certain inert organic polar solvents as the reaction medium in the nitrilation step. Results when using certain organic polar solvents were unexpectedly superior to those in which other solvents were used, even when bromo-substituted starting materials were used, as in the prior art. The bromo compounds are usually regarded as more reactive than chloro compounds in the nitrilation reaction, and higher yields are usually obtained with their use than with chloro compounds.

The inert organic polar solvents suitable for use in the present invention are the inert polar poly(dialkyl-substituted amino)compounds which can be represented by the general formula:

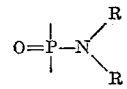

wherein R represents a methyl or ethyl radical and X represents a

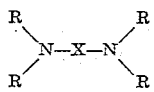

radical or a

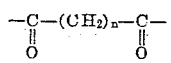

radical, wherein $n$ is an integer having a value of from 2 to about 4, and R has the same meanings as defined above.

Illustrative of the suitable inert polar organic solvents are
N,N,N',N'-tetramethylglutaramide,
N,N,N',N'-tetraethylglutaramide,
N,N-dimethyl-N',N'-diethylglutaramide,
N,N'-dimethyl-N,N'-diethylglutaramide,
N,N,N',N'-tetramethylsuccinamide,
N,N,N',N'-tetramethyladipamide,
hexamethylphosphoramide,
hexaethylphosphoramide, and the like.

The esterification of the 6-halohexanoic acid, wherein the halogen atom may be fluorine, chlorine, bromine or iodine, can be carried out by any of the conventional procedures; for example, by heating a mixture of the alcohol and halo acid in the presence of an acid such as sulfuric acid, and removing the water as it is formed. Suitable alcohols for use in the esterification reaction are the linear and branched aliphatic alcohols, the cycloaliphatic alcohols and the aralkyl alcohols, which may be represented by the empirical formula: ROH, wherein R represents a hydrocarbon radical. Illustrative of the alcohols which may be used are methanol, ethanol, isopropanol, n-propanol, n-butanol, n-octanol, 2-ethylbutanol, pentanol, 2-ethylhexanol, cyclohexanol, 1-phenylethanol, 2-phenylethanol, and the like. The esters produced by the esterification may be represented by the empirical formula: $X(CH_2)_5COOR$, wherein X represents a halogen atom and R represents a hydrocarbon radical, for example, ethyl 6-chlorohexanoate, butyl 6-chlorohexanoate, cyclohexyl 6-chlorohexanoate, 2-ethylbutyl 6-chlorohexanoate, 1-phenylethyl 6-chlorohexanoate, propyl 6-bromohexanoate, and the like.

The nitrilation of the 6-halohexanoic acid esters is carried out in an organic polar solvent using an alkali metal cyanide or an alkaline earth metal cyanide, for example, the alkali metal cyanides of lithium, sodium, potassium, rubidium and cesium, and the alkaline earth metal cyanides of strontium and barium.

The nitrilation can be carried out at temperatures of from about 70° C. to about 180° C., with 120° C. to about 140° C. preferred. In practice, the lowest limit is the lowest temperature at which reaction will take place, and the maximum temperature that can be used is dictated by the decomposition point of the solvent and of the reactants. The amount of inert organic polar solvent present is not a critical factor, and may be varied over a wide range. The reaction mixture can initially contain from 35 to 95% by weight of said solvent; however, we prefer to use about equal parts by weight of solvent and ester.

The mole ratio of inorganic cyanide salt to 6-halohexanoic acid ester is not critical, and may be varied from about 1:1 to as high a ratio as practicable. Of course, reaction will take place at lower mole ratios, but the conversion will be reduced, while at higher mole ratios no commensurate advantage is observed, and one is then faced with the problem of disposing of or recovering the excess unreacted cyanide. The reaction time will vary inversely with temperature; the higher the temperature, the shorter the time required. In general, 30 minutes to about four hours covers the practical limits, with one to two hours at from 120° C. to about 140° C. preferred, even though the reaction time is not critical.

The reduction of the 6-cyanohexanoic acid ester may be carried out by any of the conventional hydrogenation processes known in the art without any of the difficulties heretofore encountered. The problems encountered in the prior art resulted in the necessity for using special grades of Raney nickel, or Raney cobalt catalysts for the hydrogenation, which had to be performed at pressures of about 1,000 p.s.i.g. or higher. Since 7-aminoheptanoic acid cannot be distilled and is exceedingly difficult to purify by recrystallization, processes designed to produce the free acid were hampered by the difficulty of attaining the isoelectric point of the acid necessary for its proper precipitation. However, by the processes of this invention all of the prior difficulties have been avoided. For example, ethyl 6-cyanohexanoate was successfully reduced in isopropanol solution using commercially available Raney nickel catalyst at a hydrogenation pressure of about 150 p.s.i.g. In the hydrogenation of the nitrile, a small amount of anyhydrous ammonia, about 1 mole per mole of cyano ester, can be added to inhibit secondary amine formation. Ordinarily, about 10 percent ammonia by weight based on the weight of cyano ester charged is sufficient, though larger amounts may be used. The 7-aminoheptanoate esters prepared by the process of this invention can be recovered by conventional distillation techniques using high vacuum and short exposure to heat to reduce undesirable resin formation.

Other hydrogenation catalysts may also be used, as for example, palladium on carbon, platinum on carbon or Raney cobalt. The catalyst may be separated from the reduction mixture by decantation and re-used in additional hydrogenations until it has lost its activity.

The 6-cyanohexanoate esters are usually obtained in pure enough form after the nitrilation step so that they may be hydrogenated without distilling. Among the cyano esters which can be used in the reduction step there may be mentioned ethyl 6-cyanohexanoate, isopropyl 6-cyanohexanoate, butyl 6-cyanohexanoate, cyclohexyl 6-cyanohexanoate, 2-ethylbutyl 6-cyanohexanoate, 1-phenylethyl 6-cyanohexanoate, octyl 6-cyanohexanoate, and the like.

The following examples further serve to illustrate this invention. Parts are by weight unless otherwise specified.

*Example 1*

A slurry of sodium cyanide in hexamethylphosphoramide was prepared in a reaction flask from 106 parts of crystalline sodium cyanide and 357 parts of hexamethylphosphoramide. The slurry was heated to 130° C. and 357 parts of ethyl 6-chlorohexanoate were added with stirring over a 48 minute period at a temperature of 130° C. to 135° C. The reaction was stirred for an additional 40 minutes after completion of the addition of the chloro ester and then cooled and filtered to remove the sodium chloride. The filtrate was fractionally distilled under vacuum and a 90% yield of ethyl 6-cyanohexanoate was recovered, based on the amount of ethyl 6-chlorohexanoate consumed.

*Example 2*

There was charged 348 parts of N,N,N',N'-tetramethylglutaramide to a reaction flask. This was heated to 80° C. and 109 parts of sodium cyanide was added with stirring. The temperature was then raised to 135° C. and 357 parts of ethyl 6-chlorohexanoate was added with stirring, over a period of 50 minutes, at 140 to 145° C. The reaction mixture was held at that temperature for an additional hour to complete the reaction. The mixture was then allowed to cool, separated from a precipitate of 129 parts of sodium chloride and the filtrate was distilled. In this example the solvent medium was left as a residue and the chloro and cyano esters were distilled away from it. The ethyl 6-cyanohexanoate ester was obtained in 56 percent yield, at 67 percent efficiency.

*Example 3*

There were charged to a reaction flask 126 parts of hexaethylphosphoramide and 38 parts of sodium cyanide. This mixture was stirred and heated to 150° C., and over a 20 minute period 126 parts of ethyl 6-chlorohexanoate was slowly added at 150° to 160° C. The mixture was held at that temperature for an additional four hours, cooled and filtered to remove insoluble inorganic salts. The filtrate was distilled and ethyl 6-cyanohexanoate was recovered in 69% yield at an efficiency of 91%.

What is claimed is:

1. In the production of esters of 6-cyanohexanoic acid and an alcohol selected from the group consisting of aliphatic alcohols, cycloaliphatic alcohols, and aralkyl alcohols of the formula ROH wherein R is a hydrocarbon radical which comprises the nitrilation of the corresponding esters of 6-halohexanoic acid at from about 70° C. to about 180° C. with a member selected from the group consisting of alkali metal cyanides and alkaline earth metal cyanides, the improvement of carrying out the nitrilation step in an inert poly(dialkyl-substituted amino) compound selected from the group represented by the general formula:

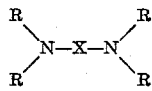

wherein R represents a member selected from the group consisting of methyl and ethyl radicals and X represents a member selected from the group consisting of a

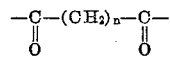

radical and a

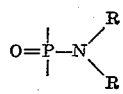

radical in which ($n$) has a value of 2 to about 4 and R has the same meanings as defined above.

2. A process as claimed in claim 1, wherein the inert poly(dialkyl-substituted amino) compound is selected from the group represented by the formula:

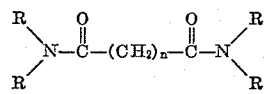

wherein ($n$) and R have the same meanings as claimed in claim 1.

3. A process as claimed in claim 1, wherein the inert poly(dialkyl-substituted amino) compound is selected from the group represented by the formula:

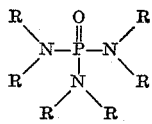

wherein R has the same meanings as claimed in claim 1.

4. A process as claimed in claim 1, wherein the poly(dialkyl substituted amino) compound in the nitrilating step is N,N,N',N'-tetramethylglutaramide.

5. A process as claimed in claim 1, wherein the poly(dialkyl substituted amino) compound in the nitrilating step is hexamethylphosphoramide.

6. A process as claimed in claim 1, wherein the poly(dialkyl substituted amino) compound in the nitrilating step is hexaethylphosphoramide.

References Cited in the file of this patent

UNITED STATES PATENTS 2,605,285    Schultz _____ July 29, 1952
2,715,137    Copelin _____ Aug. 9, 1955